United States Patent [19]
Bara

[11] 4,006,853
[45] Feb. 8, 1977

[54] CRESCENT RESET SYSTEM FOR FAST FORWARD 8-TRACK CARTRIDGE PLAYER

[75] Inventor: Edwin Stanley Bara, Chicago, Ill.

[73] Assignee: Motorola, Inc., Schaumburg, Ill.

[22] Filed: June 30, 1975

[21] Appl. No.: 591,674

[52] U.S. Cl. .......................... 226/178; 192/12 BA; 192/26; 226/188; 242/55.19 A
[51] Int. Cl.² ........................................ B65H 17/22
[58] Field of Search .................. 226/178, 174, 188; 242/55.19 A; 192/12 BA, 26, 81 R

[56] References Cited
UNITED STATES PATENTS

| 3,233,806 | 2/1966 | Shirai | 226/178 |
| 3,850,357 | 11/1974 | Lace | 226/178 |

Primary Examiner—Johnny D. Cherry
Assistant Examiner—Bruce H. Stoner, Jr.
Attorney, Agent, or Firm—James W. Gillman; Donald J. Lisa; James P. Hamley

[57] ABSTRACT

A fast forward drive for a cartridge tape player comprises upper and lower crescents which increase the effective capstan diameter in the fast forward mode. At normal playing speed the crescents index with respect to a received tape cartridge such that the capstan's surface forcibly engages the cartridge's pressure roller.

When the fast forward mode is desired a clutch couples the upper crescent to the capstan for rotation therewith. Rotational drive of the upper crescent is coupled to the lower crescent, at a predetermined phasing relationship, through a pin and trough arrangement, whereby fast forward is effected. On return to the normal play speed the upper crescent is fixedly indexed, resulting in a decreased lower crescent rotational drive and thus an increased chance of improper lower crescent alignment.

To promote lower crescent indexing the improvement contemplates a second spring clutch mounted on the capstan between the lower crescent and the housing which actively drives the lower crescent to its indexed position. In this manner a positive force operates on the lower crescent for proper indexing.

6 Claims, 4 Drawing Figures

U.S. Patent  Feb. 8, 1977  4,006,853
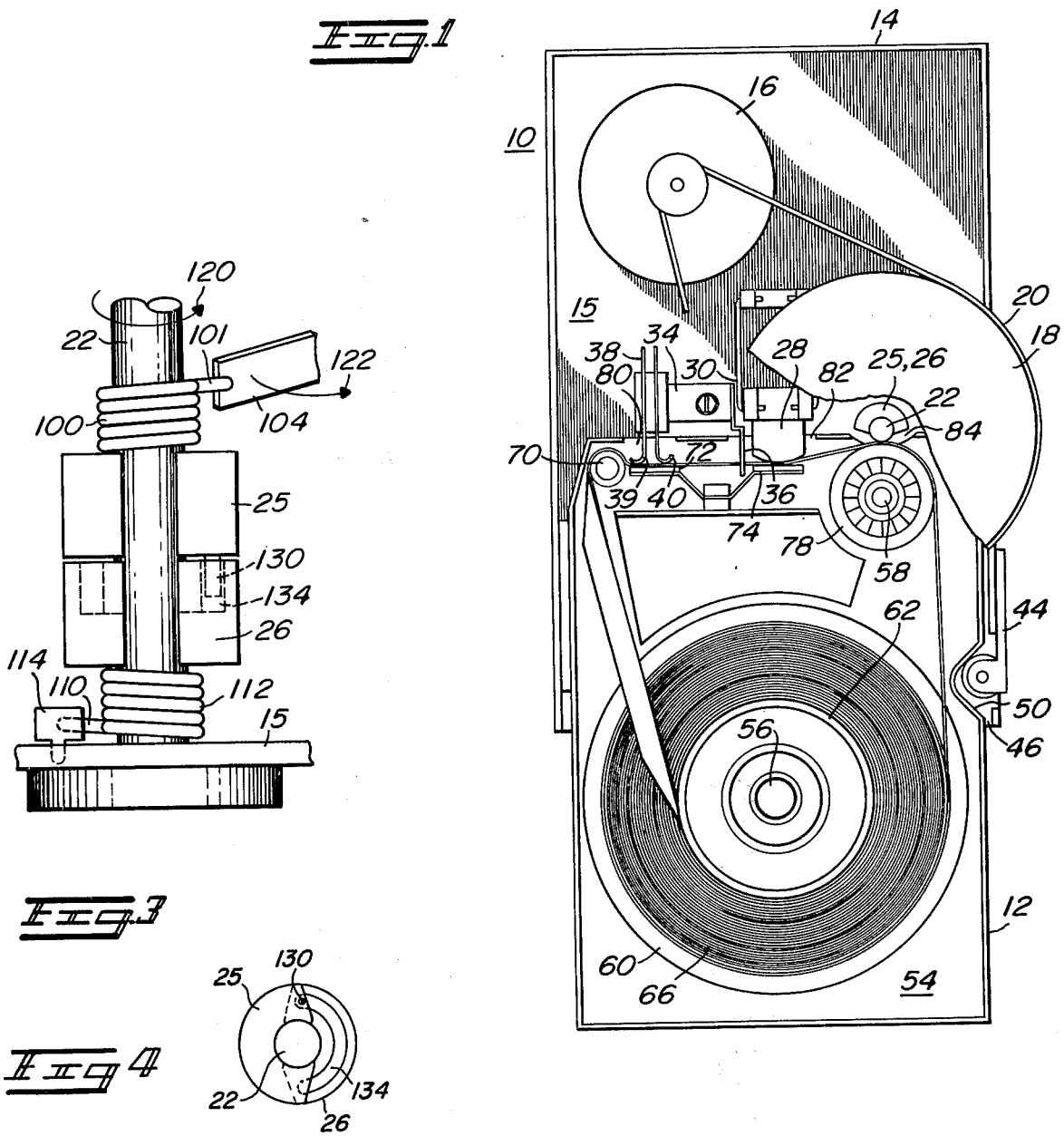
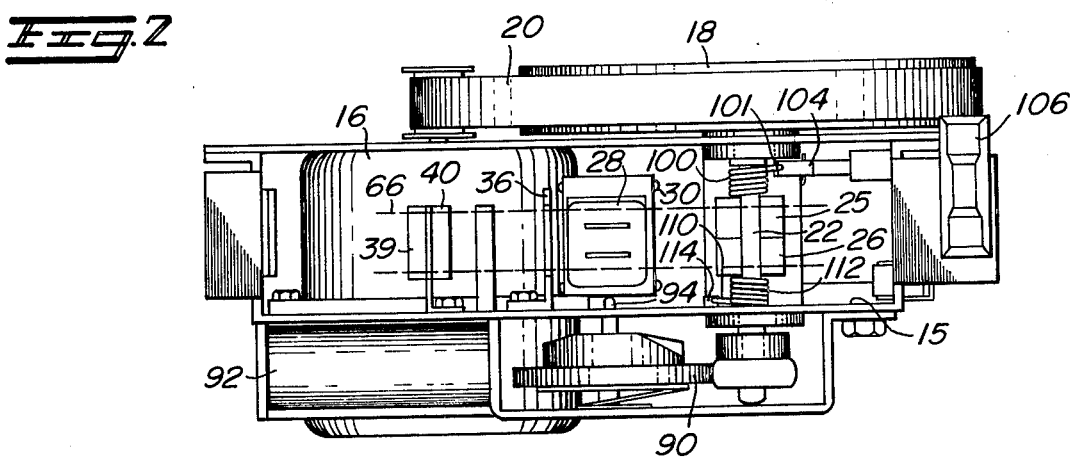

CRESCENT RESET SYSTEM FOR FAST FORWARD 8-TRACK CARTRIDGE PLAYER

BACKGROUND OF THE INVENTION

This invention pertains to continuous loop tape cartridges and, more particularly, to improvements in fast forward drives for the same. Continuous loop tape cartridge player systems are well known in the art. Basically, the cartridge is comprised of a hub, a platen, a pressure roller, and guiding means to guide a continuous loop of tape. The tape is wound about the hub and guided past a front access and around the pressure roller. The tape player is provided with a vertically standing capstan which is rotatably driven off a motor actuated flywheel. The capstan is located such that on cartridge insertion into the player the capstan forcibly engages the pressure roller thus rotatably driving the roller. The tape, being pinched between the pressure roller and capstan, is thereby driven.

Until recently, the popularity of cartridge tape players was retarded due to a serious limitation. Namely, the player could only drive the tape at a single speed. Thus, for example, if it were desired to hear a track that had just been played, the user would have to wait until the tape played through at its normal playing speed. To overcome this problem some manufacturers provided a means whereby the player motor speed was increased. This proved unsatisfactory, however, since motor life was significantly degraded. An excellent solution to the problem is offered by Melvin Lace in his application Ser. No. 563,947, filed Mar. 31, 1975, now abandoned, and assigned to the same assignee as the instant invention. Lace teaches a means whereby the effective diameter of the capstan is increased in the fast forward mode. A pair of predeterminedly developed crescents ride on the capstan, and allow capstan-pressure roller interface in the normal play mode. On activation to fast forward, the upper crescent clutches to the capstan for rotation therewith. The upper crescent rotates 180° out of phase with the lower crescent at which time rotational drive from the upper crescent is coupled to the lower crescent via a pin and trough arrangement. The crescent outer surfaces interface with the pressure roller effecting fast forward.

It has been found, however, that the above mentioned fast forward mechanism is subject to an occasional problem. When the player returns from the fast forward to the normal play speed, the upper crescent indexes and declutches at a point at which the lower crescent is still in contact with the pressure roller. Since the lower crescent had been primarily driven by the upper crescent, it loses a significant rotational force which would tend to index it back in the normal play mode. Occasionally, especially with rubber pressure rollers, the remaining rotational forces on the lower crescent are not sufficient to index it properly, resulting in an undesirable player "hang up."

OBJECT OF THE INVENTION

It is an object of the present invention, therefore, to provide a means for coupling a positive force to the lower crescent of a multiple crescent fast forward system whereby proper lower crescent indexing is assured.

Briefly, according to the invention, a fast forward cartridge tape player is comprised of a housing provided with a cartridge receiving cavity. A cylindrical capstan is rotatably driven about its longitudinal axis by a motor actuated flywheel. The longitudinal axis of the capstan is in a vertical plane and the capstan is predeterminedly positioned to engage the pressure roller of a received cartridge.

The player further comprises a plurality of crescents rotatable about the capstan. Each crescent has an inner face, an outer face and a vertical dimension. The inner face is formed to encircle greater than 180° of the capstan circumference while revealing a substantial arc on the capstan surface. A means is operable to select either the fast forward or normal speed modes. In the normal speed mode the upper crescent decouples from the capstan, and is indexed in a position such that it reveals the capstan to the pressure roller of a received cartridge. On activation to the fast forward mode, a means couples the upper crescent to the capstan for rotation therewith. A coupling and aligning means sequentially couples rotational drive from one crescent to the crescent beneath it at predetermined crescent phasings whereby the crescent's outer faces form a substantially circular configuration as viewed from a point above the axis of the capstan, thereby effecting fast forward. The improvement includes second means which couples rotational drive of the capstan to the lowermost crescent whereby it is actively driven to index at a position such that it exposes the capstan to the pressure roller when the player is activated from the fast forward to the normal speed mode.

BRIEF DESCRIPTION OF THE DRAWINGS

FIG. 1 illustrates a crescent fast forward tape player with a received tape cartridge;

FIG. 2 illustrates an end view of the tape player of FIG. 1;

FIG. 3 illustrates the crescent drive mechanism and depicts the lower crescent drive according to the invention; and FIG. 4 illustrates crescent alignment during the fast forward mode of tape player operation.

DETAILED DESCRIPTION OF A PREFERRED EMBODIMENT OF THE INVENTION

Referring to FIG. 1, a tape player 10 is shown receiving a tape cartridge 12, in cartridge receiving cavity 46. The player 10 includes a housing 14 having a base portion 15. Mounted to the base 15 is an electric motor 16, which couples rotational drive to a flywheel 18 via a drive belt 20. The flywheel 18 directly connects to a capstan 22 for rotation therewith. Located on the capstan 22 are a pair of crescents 25, 26. A tape head 28 is mounted in an indexing means 30 which mounts to the base 15. Also mounting to the base 15 is an assembly 34 which includes a tape guide 36 and an end of tape sensor 38. A spring and roller assembly 44 is affixed on the side of the mouth of the cartridge receiving cavity 46.

On reception of a tape cartridge 12 in the cartridge receiving cavity 46, the roller of the spring and roller assembly 44 forcibly engages a notch 50 in the side of the cartridge, whereby the cartridge is forcibly located within the player. The cartridge 12 includes a base portion 54 upon which is mounted a first vertically standing spindle 56 central to the cartridge base 54, and a second spindle 58 which is vertically standing in the anterior of the cartridge. A platen 60, and hub 62 are rotatably located on the first spindle 56. A continuous loop of magnetic tape 66 is wound about the hub 62, resting on the platen 60, and has its inner convolution routed out about a cartridge tape guide 70 past pressure pads 72, 74, around a pressure roller 78 which is rotatably mounted to the second spindle 58, and back to an outer convolution. Front access cavities 80, 82, and 84 allow access of the end of tape sensor 38, tape guide 36 and tape head 28, and capstan 22 to the magnetic tape, respectively.

In normal tape player operation, rotational drive of the capstan 22 couples to the pressure roller 78 whereby the tape 66 is drivably pinched therebetween. The tape is pulled from its inner convolution around guide 70, pressure pads 72, 74 and pressure roller 78 back to the hub 62. One pressure pad 74 is predeterminedly located whereby the tape is forced against the tape head 28, assuring a magnetic circuit configuration therebetween. The remaining pressure pad 72 maintains contact of the tape with the end of tape contacts 39, 40. The contacts 39, 40, when electrically bridged by a conducting element on the tape, signal end of tape operation.

The player mechanism is more clearly depicted in FIG. 2, which is an end view of the tape player as seen through the player receiving cavity 46. The motor 16 couples via a belt 20 to a flywheel 18 which, in turn, rotatably drives a capstan 22. The tape 66 from a received tape cartridge is driven past first and second end of tape sensor contacts 39, 40, tape guide 36, tape head 28, and capstan 22. The tape head 28 is shown in a tape head indexing assembly 30 comprising a developed cam 90 which is rotated via a stepping solenoid 92. A pin 94 raises or lowers the head 28 dependent upon the elevation of the stepping cam 90.

A first spring 100 is wound about the capstan 22 and has its first end affixed to the upper crescent 25, and its second end 101 extending for engagement with a stop member 104. Stop member 104 is pivotally located within the player whereby on depression of a push button 106 the member 104 is rotated out of engagement with the first spring end 101. A second spring 112, according to the invention, similarly has its turns wound about the capstan 22, and has a first end affixed to the lower crescent 26 and a second end 110 extending outwardly for engagement with a spring tail 114. The spring tail 114 is a compliant member which is anchored to the player base 15.

The crescents, and their corresponding clutch means are more clearly depicted in FIG. 3. In operation the capstan is driven in a direction indicated by arrow 120. When the stop member 104 is positioned to engage the second end 101 of the first clutch spring 100, the resultant forces tend to increase the spring's diameter whereby the upper crescent 25 is declutched from the capstan 22. Also, the spring tail 114 has a stiffness adequate for preventing the spring second end 110 from rotating, whereby the diameter of the second clutch spring 112 increases thereby declutching the second crescent 26 from the capstan 22.

On activation to the fast forward mode (i.e. on depression of the push button 106 shown in FIG. 2) the stop member 104 swings in a direction indicated by arrow 122 out of engagement with the first clutch spring second end 101. The spring 100 diameter decreases, and the spring and first crescent 25 clutch to the capstan 22 for rotation therewith. The upper crescent 25 rotates until a pin 130 extending downwardly from its lower surface forcibly engages the end wall of a trough 134 provided in the upper surface of the lower crescent 26, thereby coupling rotational drive to the lower crescent 26. The trough extends through an angle of 180° whereby the two crescents form a circular configuration as viewed from a point above the axis of the capstan 22, as illustrated in FIG. 4. In this manner the effective diameter of the capstan is increased.

Tail member 114 is sufficiently compliant such that the rotational force coupled from upper crescent 25 to lower crescent 26 via pin 130 is sufficient to overcome the holding force of spring tail 114, thus releasing the spring second end 110. At this time, the diameter of second spring 112 decreases and clutches lower crescent 26 to the capstan 22.

On return to the normal play position (i.e. on release of push button 106 in FIG. 2) the stop member 104 swings back into a position to be engaged with first clutch spring second end 101 (i.e. opposite arrow 122). The engaging of second spring end 101 with the stop member 104 effects declutching at a predetermined location whereby the upper crescent 25 is indexed to reveal the capstan 22 to the pressure roller of a received tape cartridge. At this time, the lower crescent 26 is in engagement with the pressure roller, and, since the upper crescent 25 is no longer rotating, without the second spring clutch there is very little rotational force tending to index the lower crescent 26 to its proper location for normal speed operation. However, since clutch spring 112 clutches the lower crescent directly to the capstan, the lower crescent is actively driven back to its indexed position at which point declutching occurs through the action of spring tail 114 on the second spring second end 110.

In summary, a means for actively driving the lower crescent of a multiple crescent fast drive mechanism to an indexed position has been disclosed.

While a peferred embodiment of the invention has been described hereinabove, it should be understood that many variations or modifications thereto are possible, all of which fall within the true spirit and scope of the invention.

I claim:

1. A drive mechanism for a cartridge tape player comprising
    a cylindrical capstan rotatably driven about its longitudinal axis by a motor actuated flywheel, the longitudinal axis being located in a vertical plane and pedeterminedly positioned to forcibly engage the pressure roller of a tape cartridge to be played,
    a plurality of crescents vertically stacked on, and rotatable about, the capstan, each crescent having an inner face, an outer face and a vertical dimension, the inner face encircling greater than 180° of the capstan circumference while revealing a substantial arc on the capstan surface, the outer face of predetermined curvature, the vertical height predeterminedly fixed,
    first means coupling the uppermost crescent to the capstan for rotation therewith in a first mode,
    means coupling each crescent to the crescent beneath it in the first mode, including means aligning the crescents such that the outer faces form a substantially circular configuration as viewed from a point above the axis of the capstan,
    means decoupling the uppermost crescent from the capstan in a second mode and indexing the uppermost crescent such that it reveals the capstan to the pressure roller, and
    second means coupling rotational drive of the capstan to the lowermost crescent actively driving it to index at a position such that it exposes the capstan to the pressure roller when the player is activated from the first to the second mode.

2. The mechanism of claim 1 wherein the second means further comprises means clutching the lowermost crescent to the capstan when the player is in the first mode, and declutching the crescent from the capstan in the second mode.

3. The mechanism of claim 2 wherein the second means comprises a stop member and a spring, the spring having first and second ends and a plurality of turns of given diameter, the turns located about the capstan, the first end forcibly engaging the lowermost crescent, and the second end operably engaging the stop member, whereby under the action of friction between the capstan and inner face of said crescent the spring diameter increases to slide on the capstan when the second end is held by the stop member, the spring diameter otherwise decreasing to clutch the capstan and rotate therewith.

4. The mechanism of claim 3 wherein the second means comprises means causing the stop member to hold the spring second end when the player is in the second mode, and means releasing the second end in the player's first mode.

5. The mechanism of claim 4 wherein the stop member comprises a flexible member located in the path of rotation of the second spring end, the member having a stiffness adequate for preventing the second end from rotating as a result fo the frictional force between the capstan and the lowermost crescent's inner face, and having a suitable compliance whereby the force coupled to the second end during player operation in the first mode overcomes the holding force of the stop member, thereby releasing the second end.

6. The mechanism of claim 5 wherein the stop member comprises a spring tail having first and second ends, the first end being anchored to the tape player in a stationary position and the second end being located in the path of the spring end.

* * * * *